United States Patent
Arai et al.

(10) Patent No.: US 6,718,226 B2
(45) Date of Patent: Apr. 6, 2004

(54) METHOD OF PROVIDING DATA FOR NUMERICAL CONTROL MACHINING UNIT

(75) Inventors: Hiroshi Arai, Hitachitoa (JP); Junichi Hirai, Hitachi (JP); Osamu Chiba, Hitachinaka (JP); Nobuhisa Kanamaru, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/255,109

(22) Filed: Sep. 26, 2002

(65) Prior Publication Data

US 2003/0125827 A1 Jul. 3, 2003

(30) Foreign Application Priority Data

Dec. 27, 2001 (JP) ........................................ 2001-396764

(51) Int. Cl.$^7$ ................................................. G06F 17/60
(52) U.S. Cl. ...................................... 700/180; 700/182
(58) Field of Search .................... 700/95–110, 159, 700/180–185, 231–233, 236, 237; 705/50–54, 64, 72, 77, 79, 26–29, 34

(56) References Cited

U.S. PATENT DOCUMENTS 4,281,379 A * 7/1981 Austin ..................... 364/102
6,243,611 B1 * 6/2001 Hazama et al. ............... 700/97
6,519,571 B1 * 2/2003 Guheen et al. ............... 705/14
6,539,360 B1 * 3/2003 Kadaba ..................... 705/28
2003/0050869 A1 * 3/2003 Bruynsteen ................. 705/28

FOREIGN PATENT DOCUMENTS

JP 2002342616 A * 11/2002 ........... G06F/17/60

OTHER PUBLICATIONS

The Authoritative Dictionary of IEEE Standards Terms 2000, 7$^{th}$ edition, Standards Information Network IEEE Press, p. 849.*
James R. Koelsch, "The Internet . . . a versatile metalworking tool" Oct. 1999, Machine Shop Guide Web Archive.*

* cited by examiner

Primary Examiner—Leo Picard
Assistant Examiner—Sean Shechtman
(74) Attorney, Agent, or Firm—Crowell & Moring LLP

(57) ABSTRACT

An NC data service business is created, by making use of a numerical control (NC) data service provider company PC1 provided with associated devices necessary for NC data preparation such as a CAD system, a CAM system, a dedicated NC post processor, an NC machining simulator and an NC machining unit. An NC data service provider company transmits a home page relating to the data service via a communication line, through a dialog with an NC data service user company via the home page, provides data service relating to the NC data requested by the user company and receives payment of the consideration for the service.

9 Claims, 10 Drawing Sheets

METHOD OF PROVIDING DATA FOR NUMERICAL CONTROL MACHINING UNIT

BACKGROUND OF THE INVENTION

1. Field of the Invention

The present invention relates to a method of providing data for a numerical control (NC) machining unit, including providing a preparation service for numerical control data (NC data) which are necessary for operating a numeral control machining unit (NC machining unit).

2. Conventional Art

For making use of an NC machining unit, final NC data are generally prepared in the following steps.

(1) With a CAD system, product shape data is determined and based on the determined shape data, finished shape data suitable for NC machining are prepared.

(2) Based on the finished shape data, and taking into consideration, for example, the NC machining unit and tools that will be used, cutter location (CL) data are prepared with a CAM system.

(3) The CL data are converted into NC data by a dedicated post processor which matches with the NC machining unit to be used.

(4) The NC data are checked by a processing simulator to confirm that there are no errors, so as to avoid inconveniences with regard to processing.

(5) Through application of the NC data to the NC machining unit, a workpiece is processed by cutting.

In order to prepare the NC data which are applied to the NC machining unit, devices such as a CAD system, a CAM system, a dedicated post processor and an NC machining simulator are necessary. Accordingly, when an enterprise intends to introduce an NC machining unit, it is required to pay for purchasing and maintaining the related devices such as the CAD and CAM, in addition to the NC machining unit itself. Further, education cost for operators who use these respective devices is incurred, as well as a further education period, in which the operators master the technology for using these respective devices.

Accordingly, the initial investment, the education and training cost for the operators and the period required for the introduction, are obstacles to introducing, replacing or adding an NC machining unit.

In order to help resolving these obstacles, providers (Application Service Provider: ASP entrepreneur) have appeared, who rent a variety of application software products via a communication network such as an Internet connection. For example, such products are introduced on the home page of NIKKEI BP Publishing Co. as "Bible of IT manufacturers, e article production, ASP special edition".

Further, as a specific example of ASP, Information Services International—Dentsu (ISID), Ltd. provides a three dimensional data conversion service on the company's home page in collaboration with affiliated companies. This conversion service resolves problems which occur at the time of data conversion between CAD/CAM/CAE systems of different types (for example, when using data in one CAD system for another CAD system). Inappropriate portions relating to the data diversion use are automatically detected, and corrected data are prepared.

Further, the home page of NC network Co., Ltd. offers services for opening information such as factory search, outside processing, manufacturing parts search, CAD/CAM software search, order and award, and assessment and trade of second hand processing machines of respective registered companies. These services mediate order and award, while permitting searching the specialty fields of many registered companies.

Still further, in connection with "Multi Axis Machining Service" of Aikoku Alpha Engineering Co., Ltd., the features of the company's processing technology are opened on its home page in which the company proposes to participate at the design stage.

Such conventional ASP services, however, do not offer data services, such as preparing NC data to be applied to an NC machining unit. Thus, in order to prepare NC data, as shown in the above steps (1) through (5), it remains necessary to prepare information such as finished shape data suitable for the NC machining, processing method and CL data, taking into account, for example, the NC machining unit specifications, the tools and jigs used, and to prepare the NC data based on these data.

It is thus desirable, for example, that a data service providing entrepreneur (data service provider company) and a data service receiving entrepreneur (data service user company) prepare NC data while exchanging information relating to specifications, such as the NC machining unit and the tool(s), in a dialog form. Further, it is desirable to confirm the prepared NC data through an NC machining simulation as well as to check correctness of the NC data by performing an actual NC machining.

SUMMARY OF THE INVENTION

One object of the present invention is to develop a method for providing data which can reduce costs and personal resource requirements associated with an entrepreneur's introduction of an NC machining unit for its operations.

This and other objects and advantages are achieved by the method according to the invention, in which an NC data serve provider company (provider company) offers an NC data service business. For this purpose, the NC data service provider builds a data service system that includes the necessary related devices, such as a CAD system necessary for preparing NC data, a CAM system, a dedicated NC post processor, an NC simulator and an NC machining unit. In this instance, the provider company can prepare all of these related devices by itself, or alternatively the provider company can build the data service system while contracting with one or more entrepreneurs who own these related devices. In any case, the data service system is structured in such a manner that a server represented by a computer system of the provider company is connected with these related devices via a communication network such as an Internet connection to permit mutual data communication. The data service system transmits a home page for the data service via the communication network, performs a dialog with an NC data service user company (user company) via the home page, and provides data service relating to the NC data required by the user company.

More specifically, a method of providing data for an NC machining unit according to the present invention utilizes a "service providing computer system" for performing data service for the NC machining unit, including a memory unit, a display unit, a data input and output unit and a communication unit coupled to a communication network. The service providing computer system sends, a menu screen relating to the data service to the communication network, as well as an input screen which requires input data necessary for executing a service item selected via the menu screen.

The selected service item is executed by capturing the input data inputted via the input screen, and an output screen displaying output data prepared by executing the service item is then sent to the communication network.

In the above instance, the service items may include, for example, preparation of CAD data, preparation of a process proposal, preparation of CL data, preparation of NC machining unit specification and preparation of NC data. The service providing computer system includes functions of a CAD system, a CAM system, an NC post processor and an NC simulator corresponding to the service items.

The output screen outputs one or more of the following data: finished shape data (in which shape data of a processed article outputted from a CAD system is modified for an NC machining use), CL data and NC data. Further, the output screen also outputs output data including a check result of the NC data, a processing machine CAD model, a workpiece CAD model, and/or a jig CAD model.

The service providing computer system outputs a contract screen relating to the data service to the communication network, captures user information inputted to the contract screen, and outputs an output screen showing completion of data service contract together with user ID and password to the communication network. It also sends a bill for the provided data service via the communication network to a computer system of the user, and/or to the computer system of a financing company contracted in advance. The computer system of the financing company outputs a bill for the provided data service via the communication network to a computer system of the user.

Furthermore, the service providing computer system concludes an insurance contract with a predetermined insurance company for protecting against possible damage caused in relation to the data service.

Still further, the service items include at least one item providing a dedicated NC post processor used for preparing NC data, a cutting shape sample formed by cutting with the NC machining unit and a jig shape sample used for the cutting. When a request for providing the article is inputted to the input screen, the service providing computer system transmits the same to a computer system of a delivery company contracted in advance so as to deliver the corresponding item.

EMBODIMENT OF THE INVENTION

Figure 1:
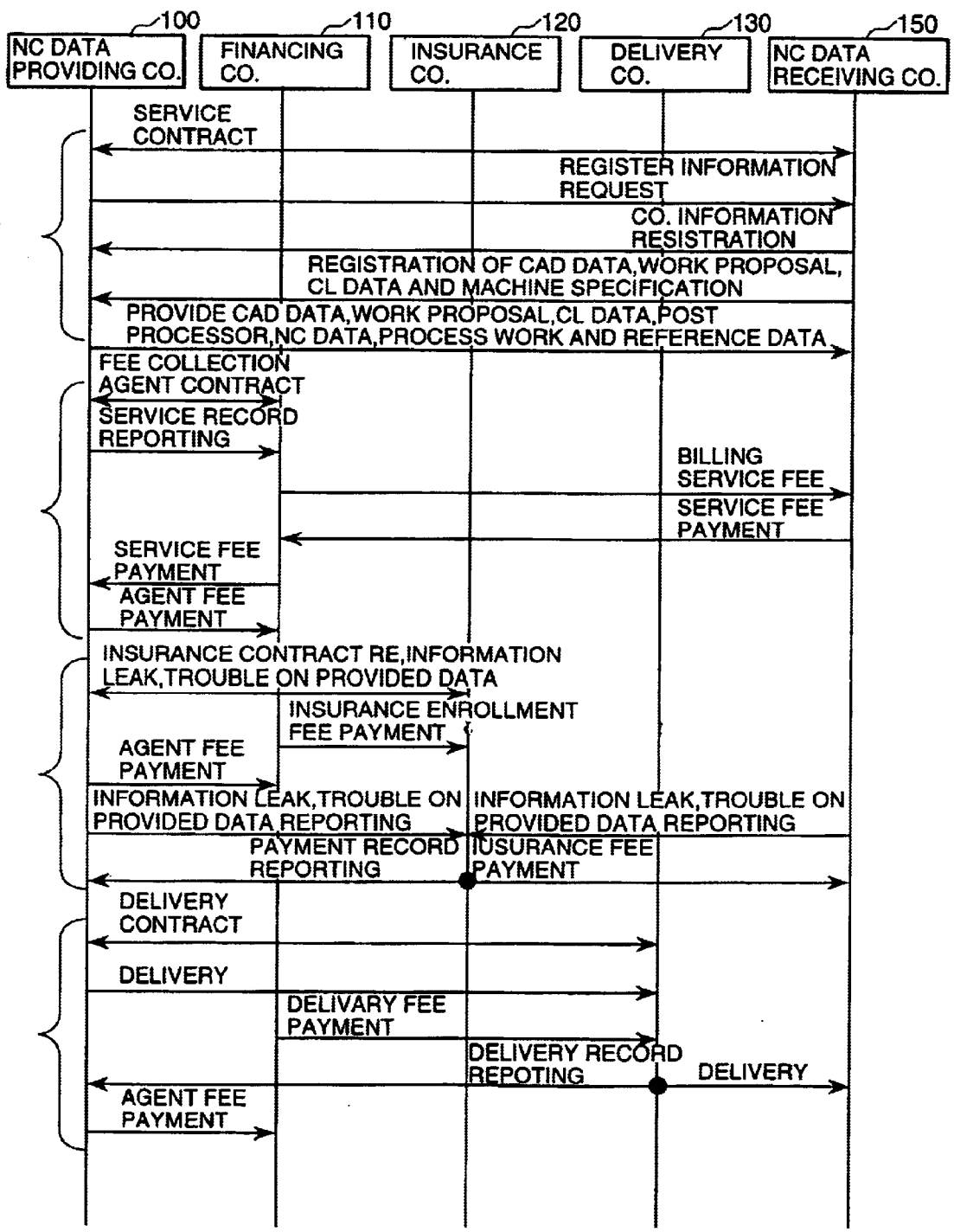
FIG. 1 is a flow chart showing one embodiment which is carried out by an NC data service system according to the present invention.

Hereinbelow, a data service system for an NC machining unit representing an embodiment to which the present invention is applied will be explained with reference to FIGS. 1 through 18. FIG. 2 shows a hardware structure of the data service system for an NC machining unit. An NC service provider company's computer system (provider company PC) 1 and an NC data service user company's computer system (user company PC) 2 are respectively constituted by the same hardware structure. Namely, each has a communication unit 210, a memory unit 220 for storing data, a display unit 230 for displaying data and a data inputting and outputting unit 240 for performing data inputting and outputting between the communication unit 210, the memory unit 220 and the display unit 230. The communication units 210 are connected via a communication medium 3 (such as an Internet connection) so as to permit mutual data exchange. The hardware in the provider company PC1 and in the user company PC2 are provided, for example, in a standard personal computer (PC). The communication medium 3 is for transferring data between the provider company PC1 and the user company PC2, and the line provided, for example, by a telephone company can be utilized.

Further, the PCs of the financing company 110, the insurance company 120 and the delivery company 130 are connected to the communication line 3 so as to permit mutual communication between the provider company PC1 and the user company PC2.

Now, a structure of a software to be provided in the provider company PC1 and the user company PC2 is discussed. Each of the PCs is provided with an operating system, a home page managing function for managing a screen which is used for transmitting data such as letters and picture images prepared by the provider company PC1 to the user company PC2 via the communication line 2, or for receiving data being transmitted from the user company PC2 and a home page browser which is used such as for transmitting data such as letters and picture images prepared by the user company PC2 to the provider company PC1, or for receiving data being transmitted from the provider company PC1. Further, the provider company PC1 is provided with software, such as a CAD, a CAM and an NC simulator, which are necessary for the NC data service.

With the above hardware and software structure, a dialog relating to an NC data service can be performed between the provider company PC1 and the user company PC2 via the home page of the provider company. Therefore, in the following explanation, except as indicated otherwise, the explanation is performed based on the home page screen which is transmitted from the provider company PC1 to the user company PC2.

Figure 2:
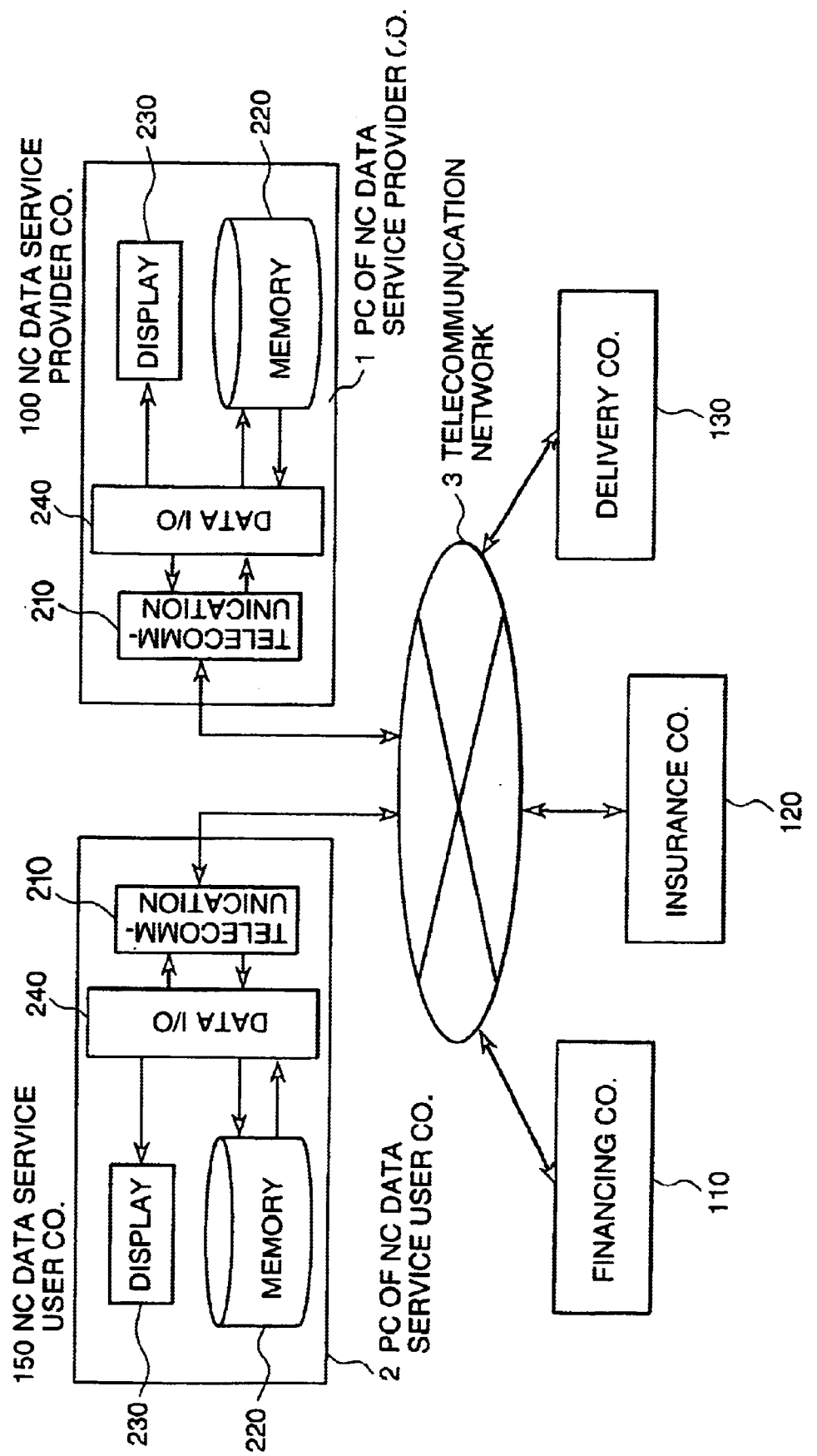
FIG. 2 is an entire structural diagram of a hardware of the NC data service system according to the present invention.

FIG. 1 shows a business flow chart relating to data service for an NC machining unit which is performed using a data service system of one embodiment according to the present invention. As illustrated in FIG. 1, the business configuration of the data service for the NC machining unit is related to, in addition to the NC data service provider company 100 and the NC data service user company, the financing company 110, the insurance company 120 and the delivery company 130. The chart includes a stage that extends from a data service contract through delivery of the respective data, a stage for collecting fees relating to the data service, a stage for insurance procedures for remedying troubles and a stage for delivering procedures for articles. Hereinbelow, the respective stages will be explained.

(1) From Data Service Contract to Respective Data Service Delivery

Figure 3:
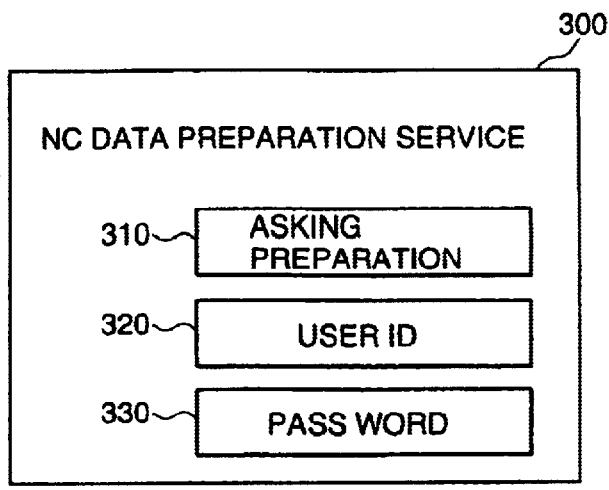
FIG. 3 is a diagram showing an example of input screens for service contract.

The NC data service provider company (provider company) 100 makes a service contract with the NC data service user company (user company) 150. The service contract can be effected, for example, via the provider company PC1 and the user company PC2. The provider company 100 prepares a NC data preparation service request screen 300 as shown in FIG. 3 as a home page and registers the same. The user company 150 opens the NC data preparation service request screen 300 by designating home page address (address).

When the user company 150 requests for the first time the NC data preparation service, a user ID 320 and a password 330 are not yet issued from the provider company 100. Therefore, without inputting the user ID 320 and the password 330 the user company clicks "Request preparation" 310 with a mouse, to initiate a registration procedure for user information.

Figure 4:
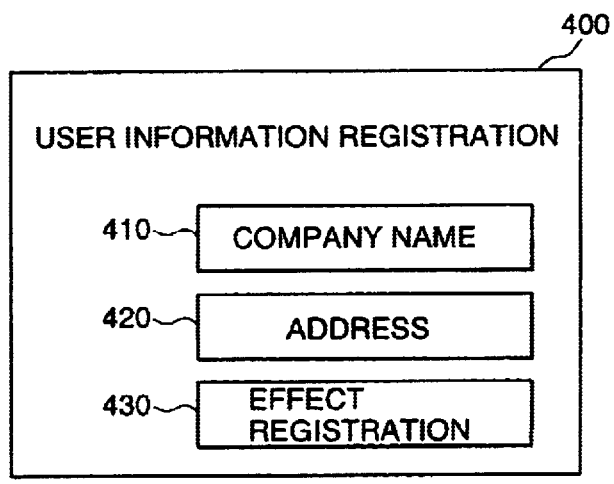
FIG. 4 is a diagram showing an example of input screens for user information registration.
Figure 5:
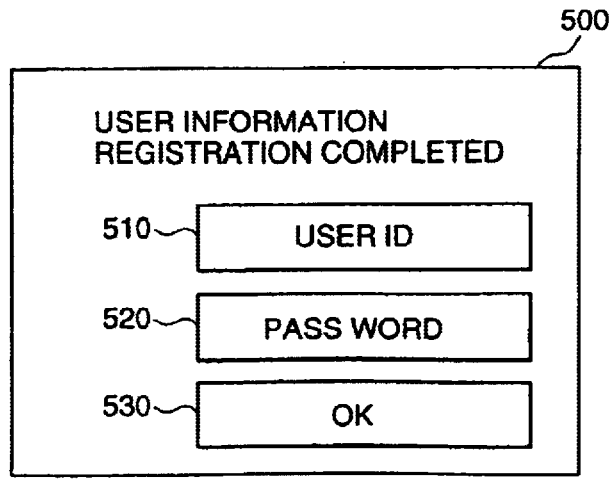
FIG. 5 is a diagram showing an example of output screens for user information registration completion.

When "Request preparation" 310 is inputted via the NC data preparation service request screen 300 without the user ID 320 and the password 330, the provider company PC1 begins the registration of the user information. That is, the provider company PC1 transmits a user information registration screen 400 as shown in FIG. 4 via the communication line 3 to the user company PC2. Based on the transmission, when an operator of the user company 150 fills a company name 410 and an address 420 on the user information registration screen 400 displayed on the display unit 25 of the user company PC2 and clicks "effect registration" 430, the company name and address of the user company 150 are transmitted to the provider company PC1. Further, in the present embodiment for the sake of simplifying the explanation the inputting of the company name 410 and the address 420 is exemplified, however, it is acceptable to prepare a screen which requires inputting email address, telephone number, address and type of business other than the above.

When the provider company PC1 receives the data "effect registration", the provider company PC1 stores the company name and the address transmitted from the user company PC2 in the memory unit 220 and, after preparing a user ID 510 and a default password 520, transmits a user information registration completion screen 500 to the user PC2. After memorizing the user ID 510 and the password 520 displayed on the user information registration completion screen 500, the user clicks OK 530.

Subsequently, the provider company PC1 again displays the NC data preparation service screen 300 as shown in FIG. 3. In response, the user company 150 inputs the set user ID 510 and password 520 at the columns of the user ID 320 and the password 330 on the NC data preparation service screen 300 and clicks again "Request preparation" 310. Thereby, the contract on the NC data preparation service is completed which permits the service to start.

When the user ID 510 and the password 520 have already been issued from the provider company 100 to the user company 150, it is sufficient to start from the process of inputting the user ID 510 and the password 520 as shown in FIG. 3. When the user company 150 wants to change the password 520, through setting a password changing screen like that of FIG. 3 the password can be changed. For example, when the user company 150 is concerned about information leakage, the password 520 can be changed periodically.

After the user company 150 registers the enterprise information at the provider company 100, the NC data preparation service starts. The provider company 100 can now provide data service without confusing plural user companies 150.

Figure 6:
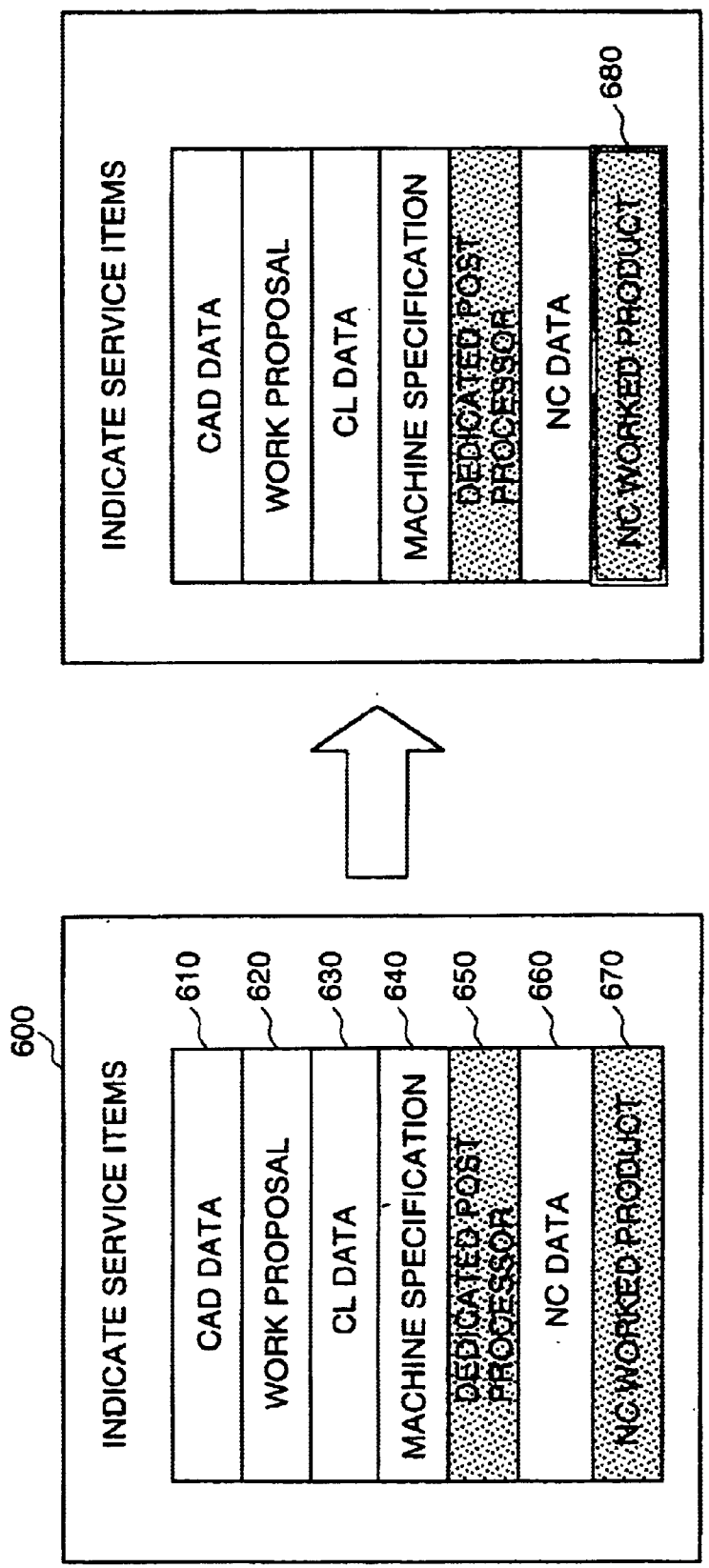
FIG. 6 is a diagram showing an example of input screens for selecting service items of NC data service.

A method for requesting NC data preparation service will now be explained with reference to FIG. 6, which shows an example of input screens for designating request items for the NC data preparation services. When receiving a request for NC data preparation service from a user company 150, the provider company PC1 transmits a service item screen 600 as shown in FIG. 6 to the user company PC2. As shown in FIG. 6, the service items according to the present embodiment are separated into CAD data 610, processing proposal 620, CL data 630, machine specification 640, dedicated post processor 650, NC data 660 and NC processed article 670. The user company 150 designates a desired service item by clicking in the service item screen 600. Thereby, the provider PC1 starts the service in the designated service item. Hereinbelow, an outline of the respective service items 610 through 670 will be explained.

The respective service items 610 through 670 are determined by dividing the necessary processing steps, through preparation of the NC data. The CAD data 610 is a service in which the CAD data inputted by the user company 150 are modified to CAD data suitable for NC machining. The processing proposal 620 is a service for providing process proposals for the NC machining to the user company 150. The CL data 630 is a service in which CL data are prepared based on the modified CAD data and the processing proposals and by making use of the CAM system. The machine specification 640 is a service for providing specification examples of NC machining units. The dedicated NC post processor 650 is a service for providing a dedicated NC post processor for matching the CL data designated by the user company 150 with the NC machining unit. NC data 660 is a service for outputting NC data meeting the designated NC machining unit as well as for executing a processing simulation. The NC processed article 670 is a service for actually preparing a processed article through NC machining.

When the user company 150 clicks one of the service items in FIG. 6, the provider company PC1 transmits a screen in which the clicked service item is highlighted to the user company PC2. In the example of FIG. 6, the NC processed article 670 is clicked and the frame thereof is highlighted as shown by 680. Highlighting may be accomplished by changing letter fonts, changing colors and standing out the frame. The dedicated post processor 650 and the NC processed article 670 are highlighted by shading in FIG. 6 to distinguish them from other service items including 610–640 and 660 in the NC data preparation services, because the dedicated post processor 650 and the NC processed article 670 include respectively the provision of software and the provision of processed article as to prevent erroneous designation by the user company 150. Further, when the user company 150 desires only NC data preparation service and not the supply of the dedicated post processor 650 and the NC processed article 670, the user company 150 can designate non-purchasing through an outputting screen which will be explained later.

The user company 150 can designate plural service items 610–670 desired. Further, when inputted information is insufficient with respect to any of the service items 610–670, the provider company 100 can transmit an input screen with respect to the insufficient service items 610–670 to the user company so as to remedy the insufficiency.

Hereinbelow, contents of the respective service items 610–670 will be explained in detail with reference to the drawings. From the provider company PC1, input screens such as shown in FIGS. 7 through 11 (which require the user company 150 to input data) are outputted.

Figure 7:
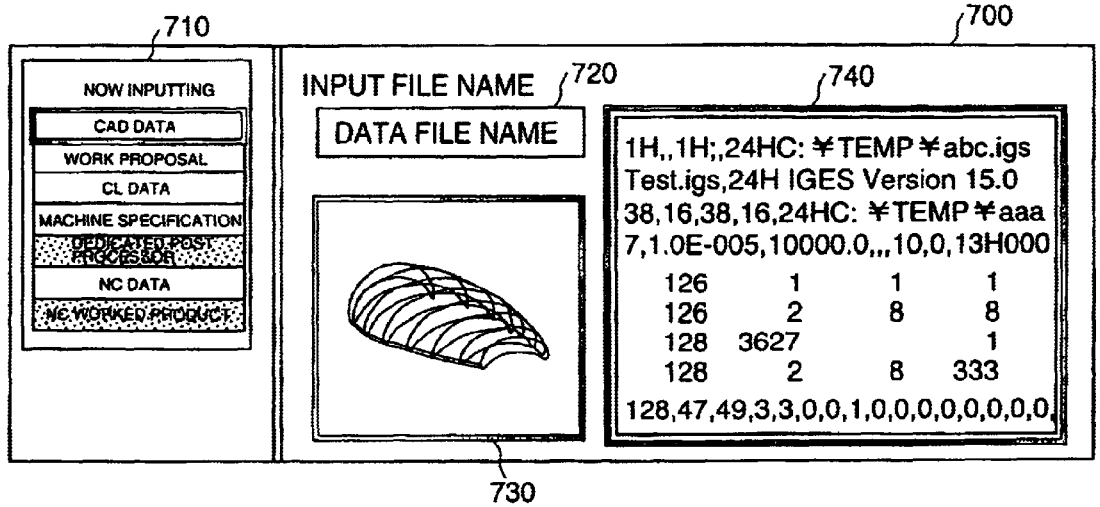
FIG. 7 is a diagram showing an example of input screens for CAD data.

FIG. 7 shows an input screen when the user company 150 clicks the CAD data 610 from the service item display screen 600 as shown in FIG. 6. The provider company PC1 transmits a CAD data input screen 700 as shown in FIG. 7 to the user company PC2. The CAD data input screen 700 includes a region 710 in which the service item now being input is highlighted, an input region 720 for a CAD data file name to be entered by the user company 150, an input region 730 for an image diagram of the CAD data and a display region 740 in which contents of CAD data are inputted. By means of the image diagram inputted in the input region 730 an outline shape of the CAD data is transferred to the provider company 100 which facilitates discrimination of the CAD data. Further, through the contents of the CAD data inputted in the display region 740, the provider company 100 can easily discriminate the type of the CAD data. Still further, when the CAD data is sent in a text format, such is displayed as shown in FIG. 7, however, when the CAD data is sent in a binary format, notes such as CAD system name, version number and read out method are inputted.

Figure 8:
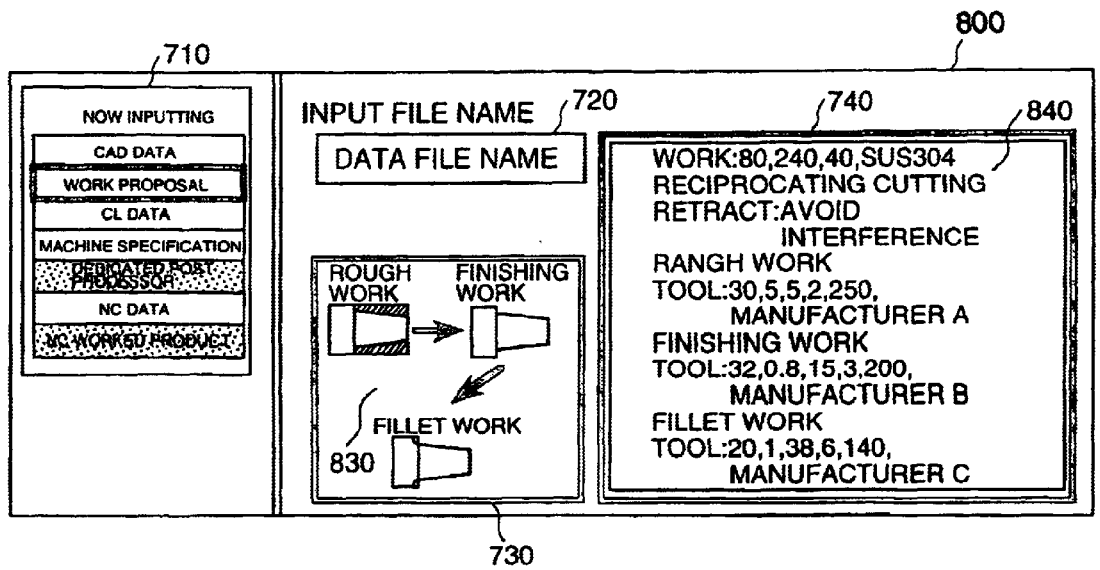
FIG. 8 is a diagram showing an example of input screens for processing proposal.

FIG. 8 shows an input screen when the user company 150 clicks the processing proposal 620 from the service item display screen 600 in FIG. 6. The provider company 100 sends to the user company PC2 a processing proposal input screen 800 constituted by a region 710 in which the service item now being input is highlighted, an input region 720 for a processing proposal data file name to be entered by the user company 150, an input region 730 for inputting image diagram of the processing proposal and a display region 740 of the processing proposal. In the input region 730 of the image diagram in FIG. 8, a process image from a rough work finishing work fillet work is inputted and displayed. Thereby, the provider company 100 can easily grasp the processing method. In the display region 740 of the processing proposal, details 840 of the processing method are inputted; the provider company 100 can prepare CL data required by the user company 150 according to the contents by making use of the CAM system. Further, as the details 840 of the processing method, such as size of the workpiece to be NC processed, information such as SUS 304 indicating the material, reciprocating cutting indicating the CL data preparation through reciprocation, retract indicating upward movement of tool and the condition thereof, the diameter and length of the tool, name of the manufacturer and type of the processing are inputted.

Herein, when the provider company 100 judges that the data inputted in the details 840 of the processing method is insufficient for preparing NC data, the provider company 100 requires the user company 150 to input the needed data (for example, via e-mail) so as to prevent erroneous CL data preparation.

Figure 9:
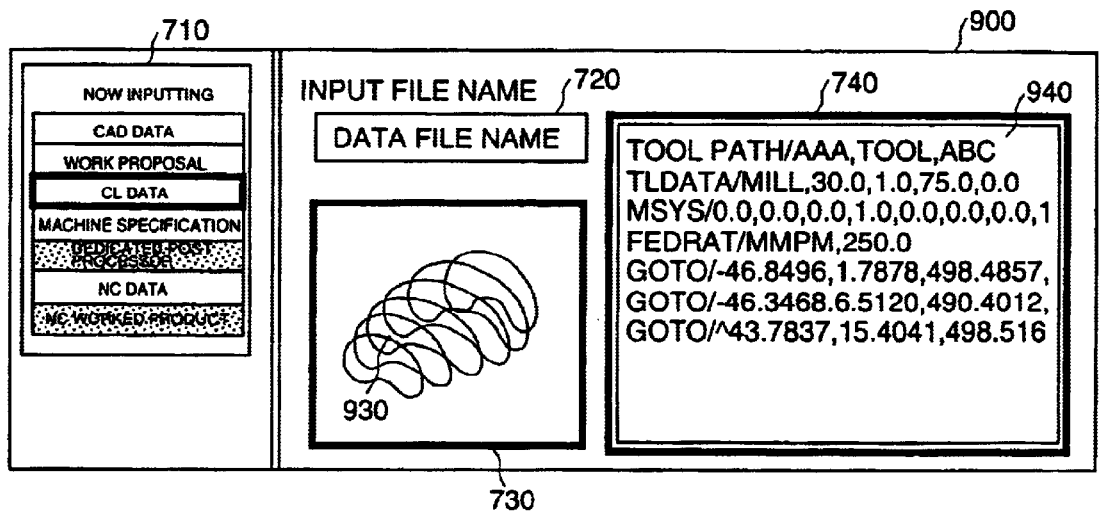
FIG. 9 is a diagram showing an example of input screens for CL data.

When the user company 150 designates the CL data 630 from the service item display screen 600 as shown in FIG. 6, the provider company PC1 sends to the user company PC2 a CL data input screen 900 as shown in FIG. 9, constituted by a region 710 in which the service item now being input is highlighted, an input region 720 for the CL data file name to be entered by the user company 150, an input region 730 for an image diagram of the CL data and a display region 740 displaying the contents of the CL data.

In FIG. 9, since a display image 930 of the CL data is displayed in the input region 730 for the image diagram, the CL data can be easily understood. Further, since in the display region of the CL data the contents 940 of the CL data are described, the provider company PC1 can prepare the NC data required by the user company 150 according to the contents and by making use of the dedicated post processor. Further, in FIG. 9 as the contents 940 of the CL data information corresponding to a common data format called APT is displayed. Since the format of the CL data is frequently unique depending on CAM system manufacturers, the provider company 100 confirms with the user company 150 the contents thereof, such as via e-mail, so as to avoid erroneous NC data preparation.

Figure 10:
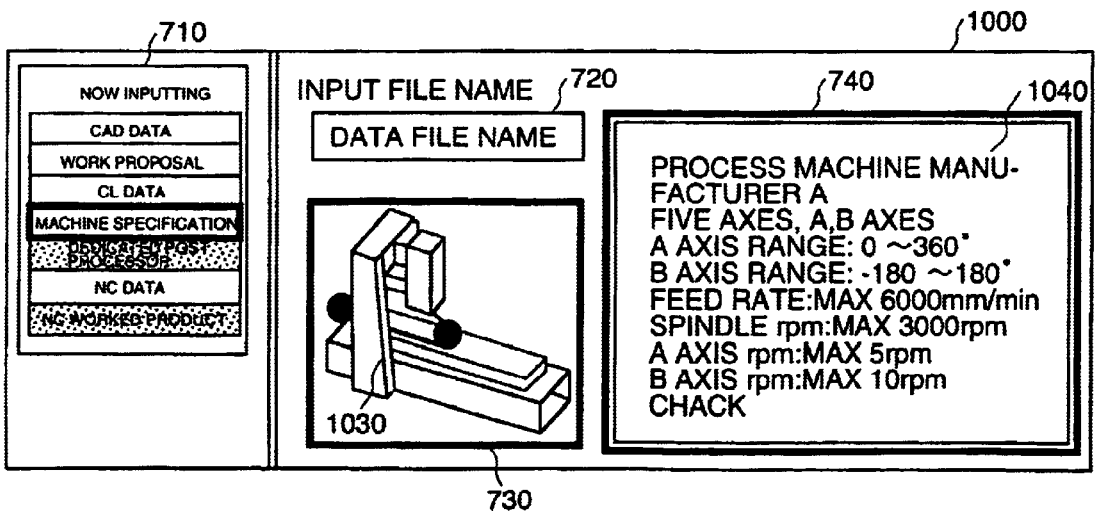
FIG. 10 is a diagram showing an example of input screens for machine specification.
Figure 11:
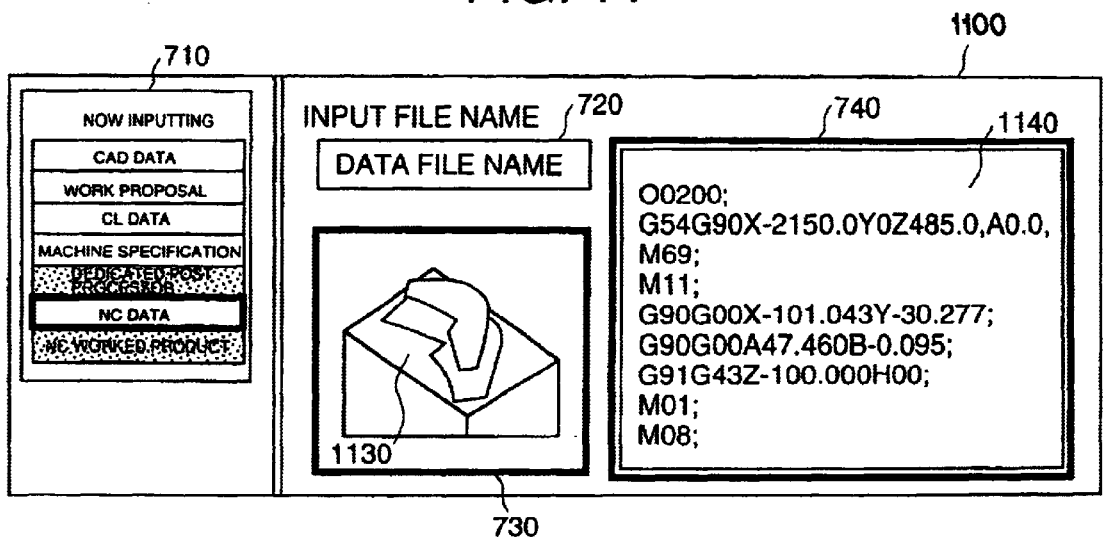
FIG. 11 is a diagram showing an example of input screens for NC data.

When the user company 150 designates the machine specification 640 from the service item display screen 600 as shown in FIG. 6, the provider company PC1 sends to the user company PC2 a machine specification input screen 1000 as shown in FIG. 10, which is constituted by a region 710 in which the service item now being input is highlighted, an input region 720 for the machine specification file name which is to be entered by the user company 150, an input region 730 for the machine image diagram and a display region 740 for the machine specification. Since, in FIG. 10 an image 1030 of the machine configuration is described in the input region 730 for the machine image diagram, the machine configuration can be easily recognized. Further, since in the display region 740 of the machine specification the contents 1040 of the machine specification are described, the provider company PC1 can prepare the NC data required by the user company 150 according to the contents thereof, using the NC dedicated post processor. In FIG. 10 as the contents of the machine specification, specifications such as name of the processing machine manufacturers, number of axes, name of axis, operable range of axis, maximum feed rate, maximum spindle rpm and maximum rpm of respective axes are inputted. When details of the machine specification are nuclear, the provider company 100 confirms with the user company 150 the contents (such as via e-mail) so as to avoid erroneous NC data preparation. When the user company 150 designates the NC data 660 from the service item display screen 600 as shown in FIG. 6, the provider company PC1 sends to the user company PC1 an NC data input screen 1100 as shown in FIG. 11 which includes a region 710 in which the service item now being input is highlighted, an input region 720 of the NC data file name which is to be entered by the user company 150, an input region 730 of the NC data image diagram and a display region 740 of the NC data. Since in the input region 730 of the NC data image diagram in FIG. 11 an image diagram prepared by cutting simulation with the concerned NC data is displayed, the NC data can be easily understood. Further, since the contents of the NC data are displayed in the display region 740 of the NC data, the provider company 100 effects the cutting simulation according to the contents thereof and performs the NC machining. In FIG. 11 NC codes in a format promulgated by Japanese machine manufacturer FANUC are displayed as the contents 1140 of the NC data. With regard to NC codes since there are codes specific to the machine, when the details of the specification are unclear, the provider company 100 confirms with the user company 150 the contents (such as via e-mail) to avoid erroneous NC data preparation. In the above manner, the user company 150 inputs the input data required by the provider company PC1 into the input screen.

Figure 12:
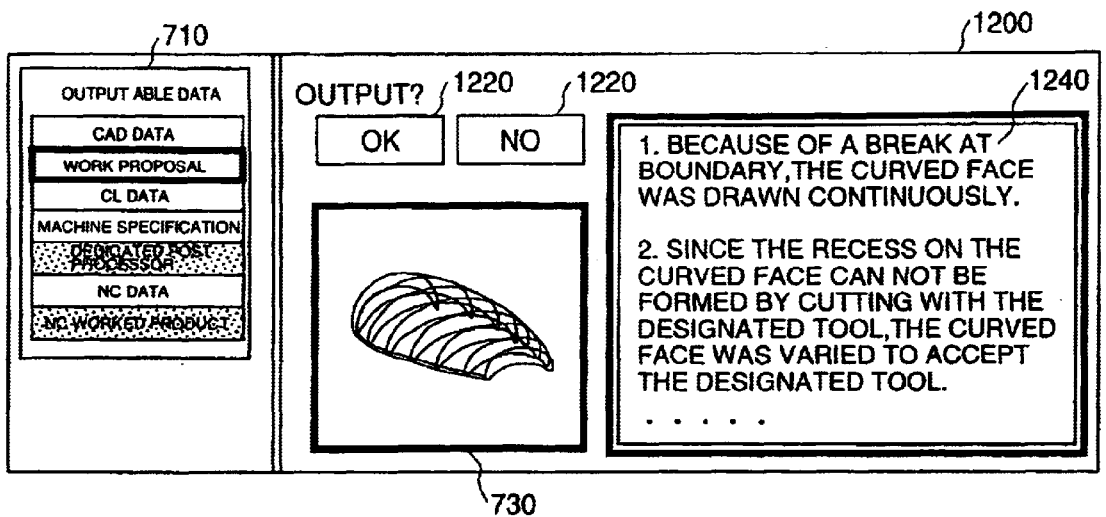
FIG. 12 is a diagram showing an example of output screens for CAD data in the service items.

Now, examples of output screens of output data which are sent from the provider company 100 to the user company 150 will be explained with reference to FIGS. 12 through 18. FIG. 12 shows an example of output screens of data when the CAD data in the service items is selected. When the user company 150 inputs necessary items in the CAD data input screen 700 as shown in FIG. 7, the provider company PC1 captures the inputted CAD data, confirms whether or not the CAD data permits an NC machining and displays the confirmation result on a CAD data output screen 1200.

The CAD data output screen 1200 is constituted by a region 710 in which the service item now being output is highlighted, an input region 1220 in which the user company 150 indicates whether or not to purchase the modified CAD data, a display region 730 for the image diagram of the modified CAD data and a display region 1240 for the modified contents of the CAD data. With the image diagram in the region 730 the outline configuration of the CAD data modified by the provider company 100 is transferred to the user company 150, errors in the CAD data can be easily discriminated. Further, since the modified contents are described in the display region 1240 of the CAD data modified contents, the user company 150 can easily prepare processing use CAD data.

Further, when OK is designated in the input region 1220, the CAD data is output, completing the process. When "No" is designated in the input region 1220, the service of providing processing proposals is performed.

Figure 13:
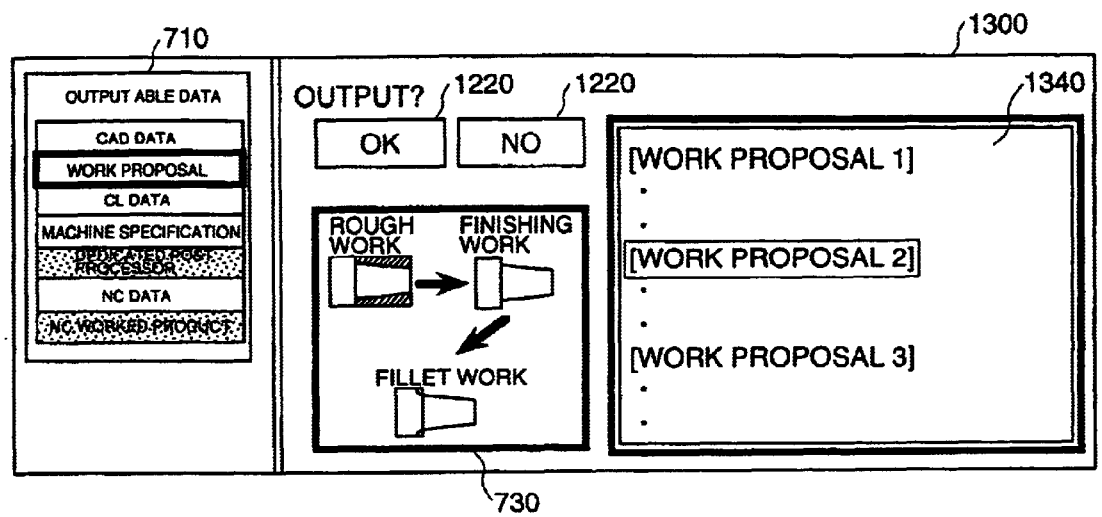
FIG. 13 is a diagram showing an example of output screens for processing proposal in the service items.

FIG. 13 shows an example of data output screens when the processing proposal in the service items is selected. The provider company PC1 prepares processing proposals for the user company 100 to perform an NC machining and displays outputs on the processing proposal output screen 1300, which includes a region 710 in which the service item now being output is highlighted, an output region 1220 in which the user company 150 indicates whether or not to purchase the processing proposal data, a display region 730 of the image diagram of the processing proposal and a title display region 1340 of the processing proposal. With the image diagram in the display region 730, the outline of the processing proposal data sent by the provider company PC1 is transferred to the user company 150, a processing proposal to be executed can be easily prepared. Further, when the title of the processing proposal is designated from the display region 1340 of the processing proposal title, the user company 150 can easily prepare an executing processing proposal by varying the image diagram of the processing proposal.

Figure 14:
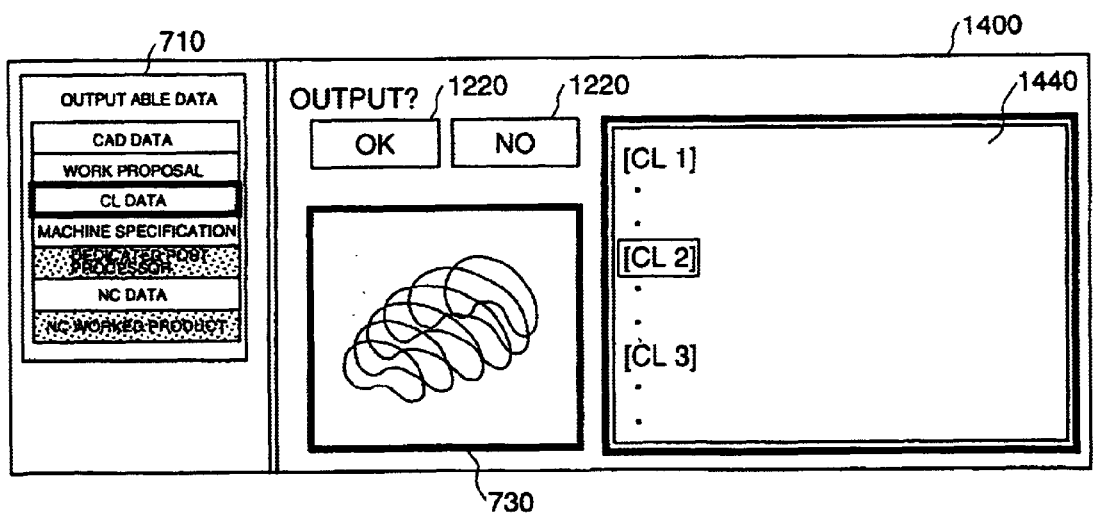
FIG. 14 is a diagram showing an example of output screens for CL data.

When the user company 150 inputs a processing proposal from the processing proposal input screen 800 as shown in FIG. 8, the provider company PC1 begins CL data providing service. FIG. 14 shows an example of output screens for the CL data providing service. The provider company PC1 displays the CL data for the user company 150 to perform the NC machining on a CL data output screen 1400, which includes a region 710 in which the service item now being output is highlighted, an input region 1220 in which the user company 150 indicates whether or not to purchase the prepared CL data, a display region 730 for the image diagram of the CL data and a display region 1440 of the CL data title. With the image diagram in the display region 730, since the user company 150 can understand the outline of the CL data sent from the provider company PC1, errors in the CL data can be easily detected. Further, when the CL data title is designated from the display region 1440 of the CL data title, the image diagram of the CL data can be varied, so that the user company 150 can easily confirm the CL data.

Figure 15:
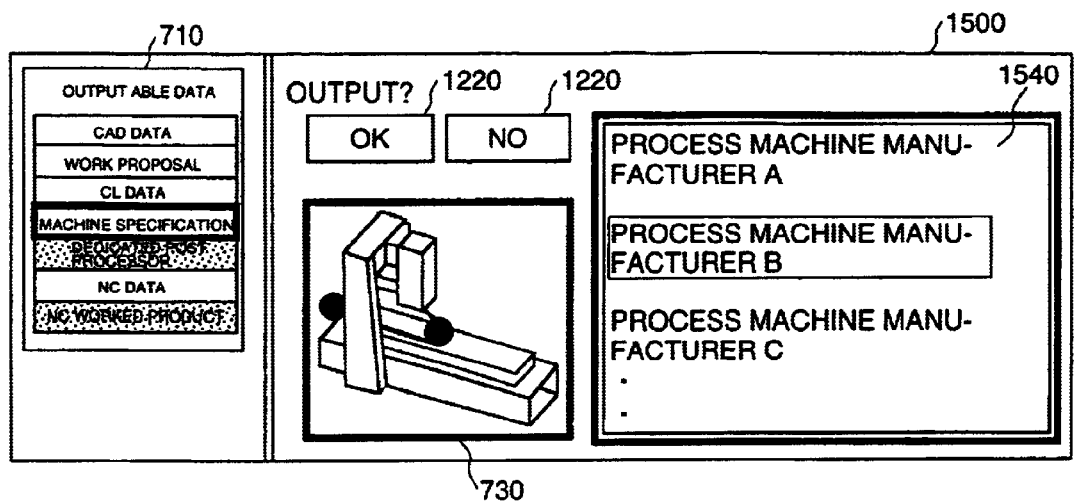
FIG. 15 is a diagram showing an example of output screens for machine specification.

On the other hand, when the user company 150 inputs CL data from the CL data input screen 900 as shown in FIG. 9, the provider company PC1 begins a machine specification providing service. FIG. 15 shows an example of output screens of output data of the machine specification providing service. The provider company PC1 displays and outputs a specification example of a processing machine with which the provider company 100 performs the NC machining on a machine specification example screen 1500. The latter includes a region 710 in which the service item now being output is highlighted, an input region 1220 in which the user company 150 indicates whether or not to purchase the machine specification example data, a display region 730 of the machine image diagram and a display region 1540 of the machine specification title. With the image diagram in the display region 730, since the outline of the machine specification sent from the provider company PC1 is transferred to the user company 150, setting of the machine specification is facilitated. Further, when the machine specification example title is designated from the display region 1540 of the machine specification title, the image diagram of the machine is varied, thereby, the user company 150 can easily recognize the machine specification.

Figure 16:
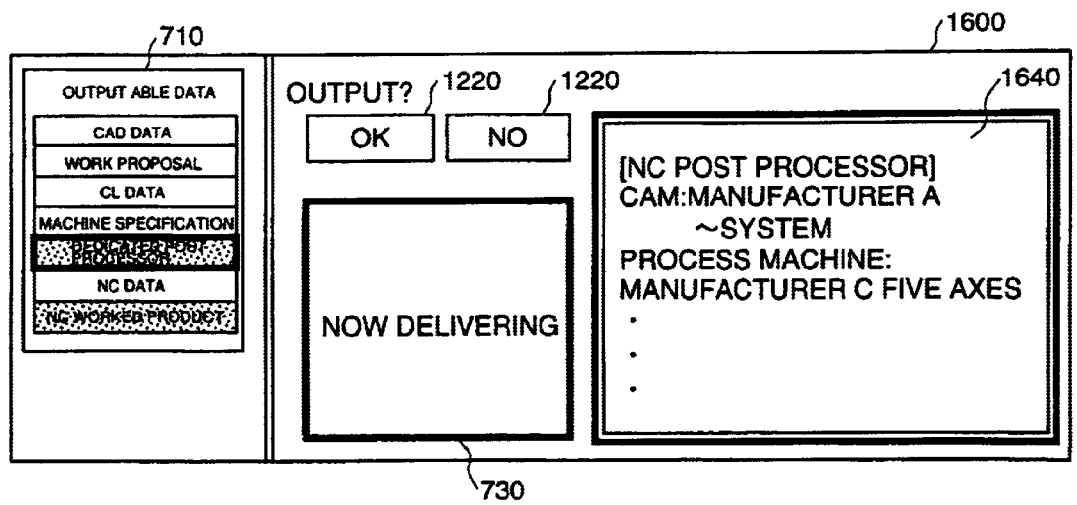
FIG. 16 is a diagram showing an example of output screens in the case of providing a dedicated post processor.

When the user company 150 inputs a machine specification from the machine specification input screen 1000 as shown in FIG. 10, the provider company PC1 begins the providing service of the dedicated post processor. FIG. 16 shows an example of output screens of the providing service of the dedicated post processor. The provider company PC1 displays for the user company 150 a dedicated post processor purchase screen 1600, which includes a region 710 in which the service item now being output is highlighted, an input region in which the user company 150 indicates whether or not to purchase the dedicated post processor, an image display region 730 for displaying delivery status and a display region 1640 of the dedicated post processor specification. With the region 730 of the image diagram, since the user company 150 recognizes the delivery status of the dedicated post processor delivered by the provider company 100, the user company 150 is prevented from double ordering. Further, since the specification of the dedicated post processor is displayed on the dedicated post processor specification region 1640, the user company 150 can confirm the specification of the dedicated post processor.

Figure 17:
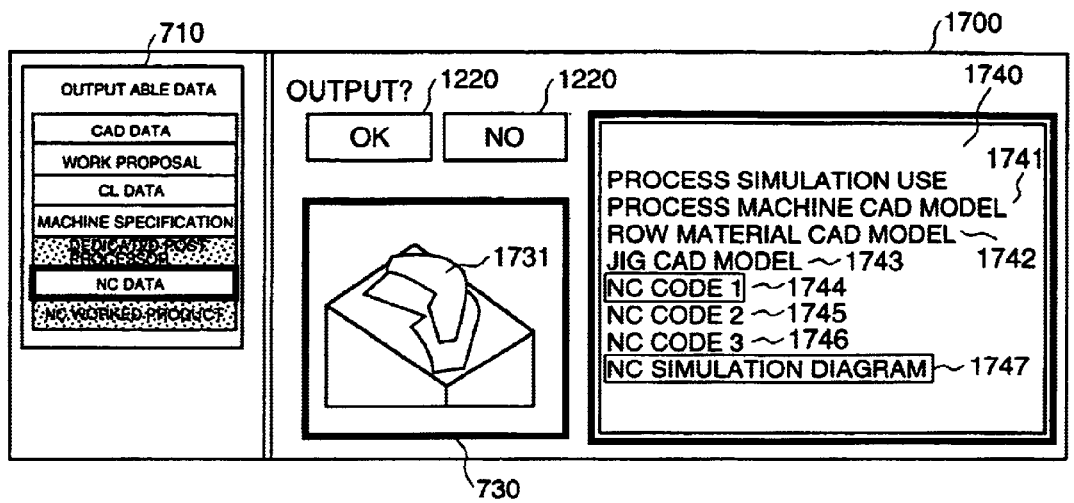
FIG. 17 is a diagram showing an example of output screens in the case of providing NC data.

When the user company 150 designates OK in the input region 1220 on the dedicated post processor purchase screen 1600, the provider company PC1 begins the NC data providing service. FIG. 17 shows an example of output screens of the NC data providing service. The provider company PC1 displays NC codes, a processing simulation and a CAD mode image used in the processing simulation on an NC data purchase screen 1700, that includes a region 710 in which the service item now being output is highlighted, an input region 1220 in which the user company 150 indicates whether or not to purchase such as the NC data prepared and the processing machine CAD model prepared for processing simulation, an image display region 730 for displaying the NC simulation result and a display region 1740 for displaying purchasing article name such as a processing machine CAD model for processing simulation, a workpiece CAD model, a jig CAD model and NC codes. Herein, when the user company 150 designates one of article names 1741–1747 displayed in the display region 1740, the letters thereof are highlighted as well as the image diagram corresponding to the article designated is designed to be displayed on the image display region 730. In FIG. 17, since an image 1731 corresponding to the NC simulation diagram 1747 is displayed, the user company 150 can efficiently select required data.

Figure 18:
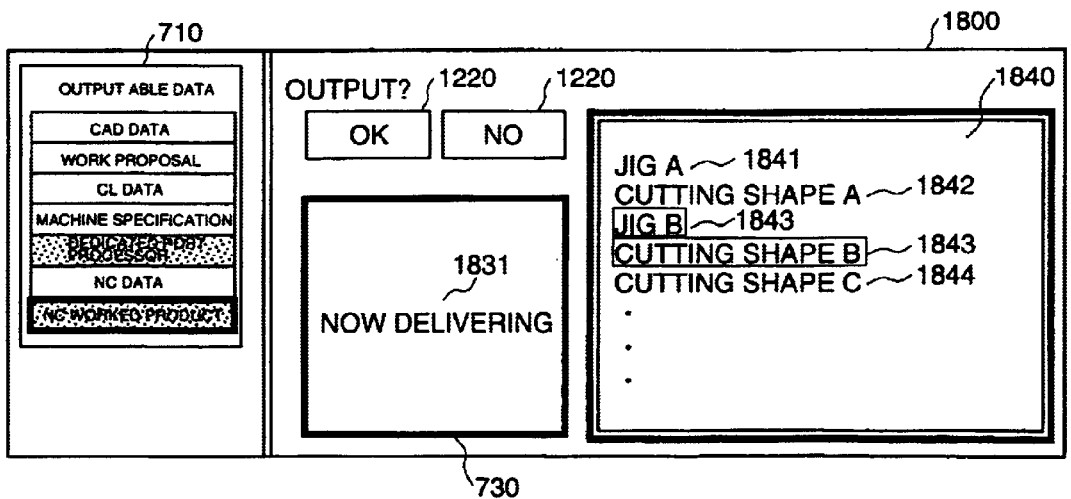
FIG. 18 is a diagram showing an example of output screens in the case of providing an NC processed article.

When the user company 150 designates OK in the input region 1220 on the purchase article name display screen 1700, the provider company PC1 begins providing the service for the NC processed article. FIG. 18 shows an example of output screens of the NC processed article providing service. The provider company PC1 displays purchase article items on an NC processed article purchase screen 1800 for performing the NC processed article providing service. The NC processed article purchase screen 1800 includes a region 710 in which the service item now being output is highlighted, an input region 1220 in which the user company 150 indicates whether or not to purchase the NC processed article, an image display region 730 for displaying delivery status and a display region 1840 for the names of articles formed by cutting for displaying jigs and cutting configuration. When the user company 150 designates one of the article names 1841–1845 displayed on the display region 1840 of the names of articles formed by cutting, the letters designated are highlighted as well as an image diagram 1831 corresponding to the delivery status is displayed on the image display region 730. Thereby, the user company 150 can confirm the delivery status of the processed article required.

As has been explained, it is designed that the provider company 100 provides the NC data and the related data or the NC processed article which the user company 150 requires. The user company 150 can obtain NC data necessary for NC machining without having to purchase a CAD system, a CAM system, an NC dedicated post processor or NC machining unit.

Further, the user company 150 can perform such testing and prior learning on the CAD system, the CAM system, the NC dedicated post processor and the NC machining unit by making use of the present NC machining service without purchasing the respective devices. As a result, the testing and education can be performed before purchasing the respective devices.

(2) Fee Collection Relating to Data Service

Now, an embodiment of performing fee collection according to the present invention will be explained with reference to FIG. 1. The provider company 100 utilizes the financing company 110 to collect the service fee, so as to limit troubles with regard to fee payment. The provider company 100 concludes a fee collection agency contract with the financing company 110, and then performs service record reportings to the financing company 110 (for example, via the communication medium 3). In this instance, the provider company 100 can transmit bills for the service fees corresponding to the contents of the service to the financing company 110.

The financing company 110 changes the service fee to the user company 150 based on the reported service records or the bills. The charge can also transmit to the user company 150 via the communication line 3. The user company 150 pays the service fee to the financing company 110 according to the charge. The financing company 110 which received the payment pays the service fee to the provider company 100. Further, the provider company 100 pays the commission fees with regard to the fee collection agency to the financing company 110. With the above system, the provider company 100 can surely collect the service fee from the user company 150 and can reduce cost relating to fee collection.

(3) Insurance Procedure for Remedying Troubles

Now, an embodiment of performing insurance contract according to the present invention will be explained with reference to FIG. 1. In case of damage caused by troubles due for example, to information leakage and provided data, the provider company 100 performs the data service business while interposing the insurance company 120. Namely, the provider company 100 concludes an insurance contract with the insurance company 120 so as to protect against damages in connection with troubles caused by such as information leakage and provided data. In this instance, the financing company 110 pays the insurance fee to the insurance company 120 to validate the insurance contract. Of course, the provider company 100 pays the insurance fee and the agency commission fee to the financing company 110. The provider company 100 and the user company 150 report to the insurance company 120 with regard to information leakage and trouble in connection with the provided data. The insurance company 120 pays, if necessary, the insurance money to the user company 150 based on the reported result as well as reports the insurance money payment record to the provider company 100.

Through the above system, the provider company 100 can reduce the damages in connection with troubles caused with the user company 150 by means of the insurance contract. Further, the insurance contract and reporting with regard to the information leakage and the provided data troubles can be performed via the communication line 3.

(4) Delivery Procedure of Articles

Finally, an embodiment for performing a delivery contract according to the present invention will be explained with reference to FIG. 1. The provider company 100 and the user company 150 interpose a delivery company 130 for delivering articles such as NC processed articles and software products and products requiring maintenance. The provider company 100 concludes a delivery contract with the delivery company 130 in connection with the NC processed article and the software products. The provider company 100 transmits a delivery request to the delivery company 130 via the communication line 3. The delivery fee is paid from the financing company 110 to the delivery company 130, therefore, the provider company 100 performs the delivery request reportings to the financing company 110. The delivery company 130 delivers the article to the user company 150, reports the delivery record to the provider company 100 and demands payment of the delivery fee to the financing company 110. These reporting and payment demand can be performed via the communication line 3.

The provider company 100 finally pays the delivery fee and the agency commission fee to the financing company 110. Through such system, the provider company 100 can reduce troubles with the user company 150 in connection with the delivery.

According to the embodiments described above, by making use of the technology of the NC data service provider company 100, the NC data service user company 150 can obtain the data relating to the NC data preparation and the processed articles prepared by the NC data. Accordingly, the NC data service user company 150 saves the purchasing and maintenance fees of such as the CAD system, the CAM system, the NC dedicated post processor, the NC machining simulator and the NC machining units as well as the education cost and education period for mastering the proper use of these devices are reduced.

As has been explained, according to the NC data service method of the present invention, for an entrepreneur who plans such as introduction of an NC machining unit, a variety of costs relating to such as introduction of the NC machining unit and human resources therefore can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing data for an NC machining unit using a computer system to perform data service for the NC machining unit, which computer system includes a memory unit, a display unit, a data input and output unit and a communication unit coupled to a communication network, wherein:

with said computer system, a menu screen relating to the data service is outputted to the communication network;

an input screen for entering input data necessary for executing a service item selected via the menu screen is outputted to the communication network;

the selected service item is executed by capturing input data inputted in the input screen;

an output screen for output data prepared by executing the selected service item is outputted to the communication network;

the input screen comprises a first region in which a service item that is now being input is highlighted, a second region in which a data file name of the highlighted service item is required to be input, a third region in which an image diagram of the highlighted service item is to be input and a fourth region in which contents of the highlighted service item is to be input; and the output screen comprises a first region in which a service item now being output is highlighted, a second region for indicating whether or not the highlighted service item is to be purchased, a third region in which a modified image diagram of the highlighted service item is displayed and a fourth region in which modified contents of the highlighted service item are displayed.

2. The method of providing data for an NC machining unit according to claim 1, wherein:

the service items displayed in the input screen includes at least one service selected from the group consisting of preparation of CAD data, preparation of process proposal, preparation of cutter location data, preparation of NC machining unit specification, and preparation of NC data; and the computer system comprises functions of a CAD system, a CAM system, an NC post processor and an NC simulator corresponding to the service item.

3. The method of providing data for an NC machining unit according to claim 1, wherein the output screen outputs at least one item of output data selected from the group consisting of finished shape data for a processed article, outputted from a CAD system and modified for an NC machining use; CL data; and NC data.

4. The method of providing data for an NC machining unit according to claim 3, wherein the output screen outputs at least one type of output data selected from the group consisting of a result check of the NC data, a processing machine CAD model, a workpiece CAD model, and a jig CAD model.

5. The method of providing data for an NC machining unit according to claim 1, wherein the computer system outputs a contract screen relating to the data service to be provided via the communication network, captures user information input to the contract screen by a user, and outputs to the communication network an output screen showing completion of data service contract together with user ID and password.

6. The method of providing data for an NC machining unit according to claim 5, wherein the computer system outputs a bill for the price of the provided data service via the communication network to a computer system of the user.

7. The method of serving data for an NC machining unit according to claim 5, wherein the service providing computer system outputs a bill for the price of the provided data service via the communication network to a computer system of a financing company contracted in advance, and the computer system of the financing company outputs a corresponding bill via the communication network to a computer system of the user.

8. The method of providing data for an NC machining unit according to claim 5, wherein the service providing computer system concludes an insurance contract with an insurance company, for protecting against possible damage caused in relation to the data service.

9. The method of providing data for an NC machining unit according to claim 1, wherein:

the service items displayed on the input screen include providing a separate dedicated NC post processor used for preparing at least one item selected from the group consisting of NC data, a cutting shape sample formed by cutting with the NC machining unit and a jig shape sample used for the cutting; and the computer system, when a request for providing the article is inputted in the input screen, transmits the same to a computer system of a delivery company contracted in advance so as to deliver the corresponding article.

* * * * *